(12) United States Patent
Iwane et al.

(10) Patent No.: US 8,814,365 B2
(45) Date of Patent: Aug. 26, 2014

(54) OPTICAL DEVICE AND PROJECTION DEVICE USING THE OPTICAL DEVICE WHICH REDUCE REGISTRATION SHIFT CAUSED BY HEAT

(75) Inventors: Tetsuaki Iwane, Kanagawa (JP); Yoshihisa Aikoh, Aichi (JP); Hideki Yamamoto, Kanagawa (JP); Keisuke Homma, Kanagawa (JP)

(73) Assignee: Sony Corporation (JP)

( * ) Notice: Subject to any disclaimer, the term of this patent is extended or adjusted under 35 U.S.C. 154(b) by 337 days.

(21) Appl. No.: 13/109,075

(22) Filed: May 17, 2011

(65) Prior Publication Data
US 2011/0292353 A1    Dec. 1, 2011

(30) Foreign Application Priority Data
May 25, 2010    (JP) ................. P2010-119032

(51) Int. Cl.
*G03B 21/20*    (2006.01)
(52) U.S. Cl.
USPC ............................................................ 353/85
(58) Field of Classification Search
CPC ............... H04N 9/3197; G03B 21/20
USPC ........ 353/81; 349/5–8, 57, 58, 59; 359/201.2, 359/237–324
See application file for complete search history.

(56) References Cited

U.S. PATENT DOCUMENTS 7,416,307 B2    8/2008  Sato et al.
2006/0285042 A1*  12/2006  Chen et al. ................ 349/117

FOREIGN PATENT DOCUMENTS

| JP | 2007-108735 A  |   | 4/2007 |
| JP | 2007108735 A   | * | 4/2007 |
| JP | 4285462 B2     |   | 6/2009 |

* cited by examiner

*Primary Examiner* — Georgia Y Epps
*Assistant Examiner* — Danell L Owens
(74) *Attorney, Agent, or Firm* — Lerner, David, Littenberg, Krumholz & Mentlik, LLP

(57) ABSTRACT

An optical device includes: a light synthesis prism that synthesizes incident light beams which are incident to a plurality of incidence surfaces and outputs the synthesized light beams; a light modulation unit that includes an optical compensation element and a reflective light modulation device; and a fixing member that fixes a reflective polarization element and the light modulation unit to the light synthesis prism so as to correspond to one of the incidence surfaces, wherein the light modulation unit includes a light blocking member that blocks light from reaching the light modulation unit and limits light with which the optical compensation element and the reflective light modulation device are irradiated, to light passing an aperture portion; and a heat insulating member that comes into contact with the light blocking member and the fixing member.

9 Claims, 15 Drawing Sheets

OPTICAL DEVICE AND PROJECTION DEVICE USING THE OPTICAL DEVICE WHICH REDUCE REGISTRATION SHIFT CAUSED BY HEAT

CROSS-REFERENCE TO RELATED APPLICATION

The present application claims priority from Japanese Patent Application No. JP 2010-119032 filed in the Japanese Patent Office on May 25, 2010, the entire content of which is incorporated herein by reference.

BACKGROUND OF THE INVENTION

1. Field of the Invention

The present invention relates to an optical device and a projecting device using the same.

2. Description of the Related Art

A front projector (projection device) which is one image display device often use a discharging lamp as a light source and a transmissive liquid crystal device or DMD (Digital Micromirror Device) as an image modulation element, and thus can be combined with devices and optical systems through various improvements. In addition, in recent years, projection type image display devices using reflective liquid crystal panels (reflective optical modulation elements) having higher resolution have been also put into practical use.

In the market of front projectors, brightness of displayed images is an important factor for gaining superiority. The improvement in the brightness of projected images is a current trend, but is not easily realized since a difficult problem such as the need for a heat measure in the front projector device exists.

For example, the increase in a temperature of the inside of the front projector device increases temperatures of constituent components. It is known that the linear expansion of the constituent component of which the temperature increases causes several defects. One of the defects is a registration shift. The registration shift is a phenomenon in which three image light beams of RGB do not overlap with each other at a correct position on a screen but are misaligned, and thus projected images look blurred.

In the front projector using the reflective liquid crystal panels, three images overlap with each other on the screen using a projection lens by allowing the image light beams obtained by three reflective liquid crystal panels to pass through a reflective polarizer or a color synthesis prism which synthesizes the image light beams. The positions of the reflective liquid crystal panels are regulated such that three images overlap with each other on the screen and are fixed using an adhesive or the like. However, the linear expansion in the constituent elements after being fixed shifts the position of each reflective liquid crystal panel and causes the registration shift.

Therefore, a projector has been proposed in which two fixing plates are joined to upper and lower edges of a light incidence surface of a color synthesis prism roughly parallel to each other, and the color synthesis prism, a reflective polarization element, and reflective liquid crystal panels are installed (for example, refer to Japanese Patent No. 4285462). According to the proposal, since the plate-shaped polarization element is fixed to the light incidence surface of the color synthesis prism via the fixing plate having a relative low linear expansion coefficient, it is possible to prevent the registration shift with a simple structure in the front projector.

In addition, there has been proposed a reflective projection display device which includes reflective liquid crystal panels, a wave plate provided in a reflective polarizer, a wave plate holder which holds the wave plate and has a first aperture, and a transmission window (a second aperture) which is provided between the wave plate holder and the reflective polarizer and is smaller than the first aperture (for example, refer to JP-A-2007-108735). According to the proposal, since unnecessary light does not reach the wave plate holder due to the second aperture smaller than the first aperture of the wave plate holder, a temperature of the wave plate does not increase, and for this reason, it is possible to prevent shading from being generated in images on the screen due to birefringence occurring in the wave plate.

SUMMARY OF THE INVENTION

However, as the causes of the registration shift, there are at least a thermal stress applied to the reflective polarization element and a thermal stress due to heat reception of an assembly forming the reflective liquid crystal devices. The registration shift caused by the former is improved by fixing the plate-shaped polarization element via the fixing plate having a relatively low linear expansion coefficient, but the registration shift caused by the latter has not been sufficiently improved yet.

For example, a UV (ultraviolet) cured adhesive resin holding the reflective liquid crystal device itself receives heat via a light blocking plate (a panel side light blocking plate) which blocks light from reaching areas other than active areas of the reflective liquid crystal device, and generates the linear expansion. The linear expansion in the UV cured adhesive resin causes the reflection surface of the reflective liquid crystal device to be changed in three-axis directions of XYZ and to be shifted from a designed central position. The respective reflective liquid crystal devices of R, G and B are displaced differently from each other, and thereby the registration shift occurs.

In addition, peripheral components of each of the reflective liquid crystal devices receive heat via the light blocking plate which blocks light from reaching the areas other than the active area of the reflective liquid crystal device, and each of the peripheral components generates the linear expansion. The thermal stress due to the linear expansion in the peripheral components also slightly shifts the incidence surfaces of the reflective liquid crystal devices from the designed central position in the three-axis directions of XYZ, and thus causes the registration shift.

The solution is as follows. The periphery of the reflective light modulation device assembly is held by a solid component, and a material for the peripheral component is selected so as not to increase a temperature of the UV cured adhesive resin. Further, the structure thereof is designed so as to suppress the linear expansion due to heat from the peripheral component, and thus a variation amount in the reflective liquid crystal device is reduced.

However, the more solid structure directly increases costs since the sizes of components or the number of components increase and materials are limited. In addition, when materials for preventing the linear expansion are selected, high heat dissipation is necessary, and the assembly strength is also necessary. Thus, it is not easy to select compatible components having different performances. An example of materials having the high heat dissipation includes aluminum, which does not have sufficient assembly strength.

There has been proposed a method in which the increase in a temperature of the wave plate is suppressed so as not expose the wave plate holder to unnecessary light, but since a reflective polarization element is fixed as a solid part, it cannot be expected that registration shift will be improved.

Thus, it is desirable to provide an optical device and a projection device capable of reducing the registration shift caused by heat reception of assembly forming reflective liquid crystal devices.

According to an embodiment of the present invention, there is provided an optical device including a light synthesis prism, a light modulation unit, and a fixing member. The light synthesis prism synthesizes incident light beams which are incident to a plurality of incidence surfaces and outputs the synthesized light beams. The light modulation unit has an optical compensation element and a reflective light modulation device. The fixing member fixes a reflective polarization element and the light modulation unit to the light synthesis prism so as to correspond to one of the incidence surfaces. In addition, the light modulation unit includes a light blocking member and a heat insulating member. The light blocking member blocks light from reaching the light modulation unit and limits light with which the optical compensation element and the reflective light modulation device are irradiated, to light passing an aperture portion. The heat insulating member comes into contact with the light blocking member and the fixing member.

According to another embodiment of the present invention, there is provided a projection device including a light source, an optical device, and a projection means. The optical device separates light beams emitted from the light source according to wavelength bands for modulation and synthesizes and emits the modulated light beams. The projection unit projects and outputs the light beams emitted from the optical device.

In addition, the optical device includes a light synthesis prism, a light modulation unit, and a fixing member. The light synthesis prism synthesizes incident light beams which are incident to a plurality of incidence surfaces and outputs the synthesized light beams. The light modulation unit has an optical compensation element and a reflective light modulation device. The fixing member fixes a reflective polarization element and the light modulation unit to the light synthesis prism so as to correspond to one of the incidence surfaces. In addition, the light modulation unit includes a light blocking member and a heat insulating member. The light blocking member blocks light from reaching the light modulation unit and limits light with which the optical compensation element and the reflective light modulation device are irradiated, to light passing an aperture portion. The heat insulating member comes into contact with the light blocking member and the fixing member.

According to the optical device and the projection device of the embodiments of the invention, it is possible to reduce the registration shift caused by heat reception of an assembly constituting reflective liquid crystal devices.

DESCRIPTION OF THE PREFERRED EMBODIMENTS

Figure 1:
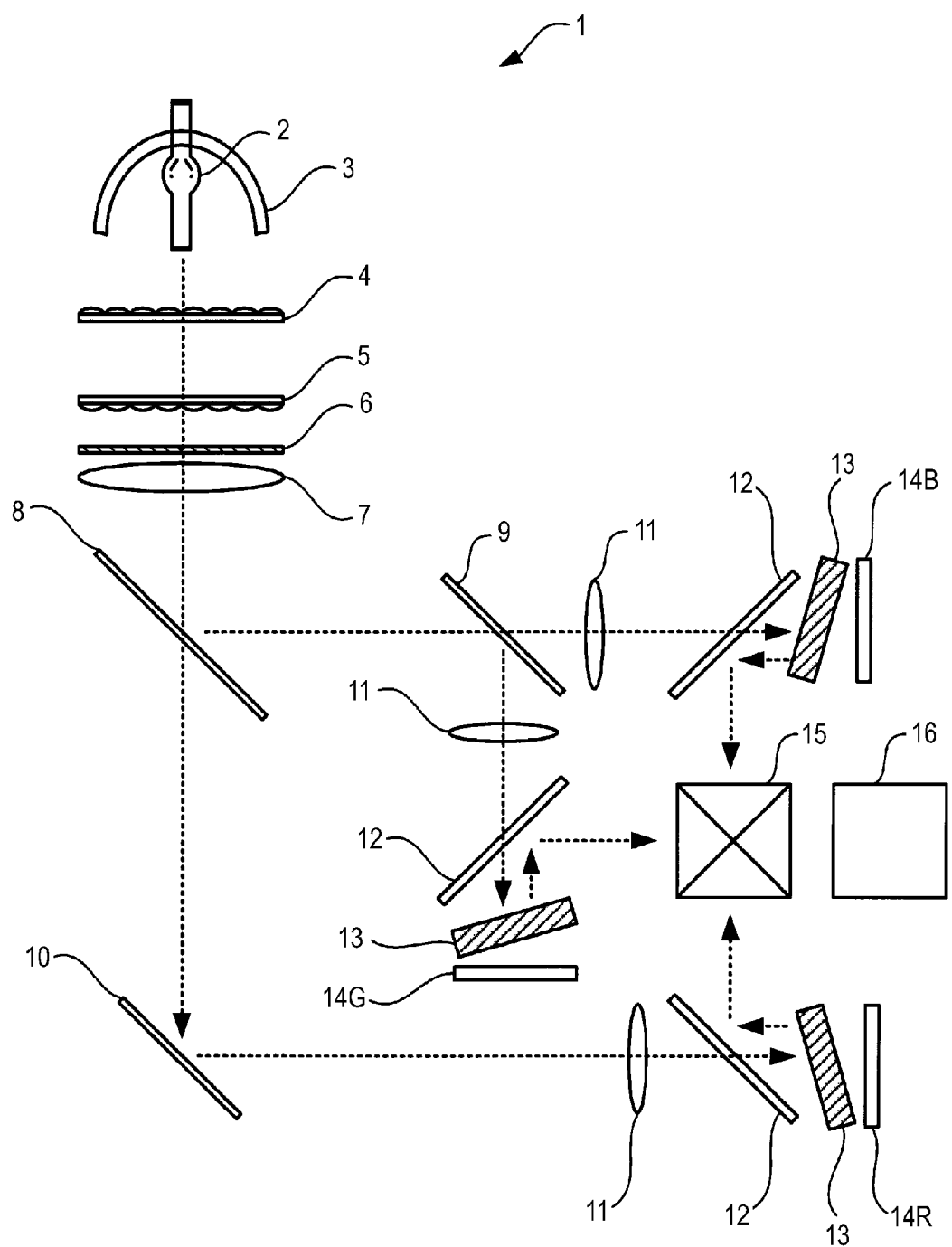
FIG. 1 is a diagram illustrating a configuration example of a projection device according to a first embodiment.

Hereinafter, embodiments of the present invention will be described in detail with reference to the accompanying drawings. First, the entire configuration of a projection device according to a first embodiment will be described with reference to FIG. 1. FIG. 1 is a diagram illustrating a configuration example of the projection device according to the first embodiment.

A projection device 1 includes a light source 2, a reflector 3, a fly-eye lens 4, a fly-eye lens 5, a polarization beam splitter (polarization element) 6, a condenser lens 7, a separation and synthesis optical system, and a projection lens (projection optical system) 16.

The light source 2 is, for example, an HID (High Intensity Discharge) lamp such as an extra high pressure mercury lamp or a metal halide lamp and emits white light. The light source 2 is disposed at a focal position of the reflector 3, and the reflector 3 generates substantially parallel light by reflecting the white light emitted from the light source 2 with reflector 3.

The substantially parallel light reflected by the reflector 3 is incident to the fly-eye lens (first fly-eye lens) 4 and the fly-eye lens (second fly-eye lens) 5 and then is emitted to the polarization beam splitter 6. The fly-eye lens 4 and the fly-eye lens 5 make illuminance of light which is incident to a reflective light modulation device 14 described later uniform.

The polarization beam splitter 6 arranges the polarization axis of the emitted light in a predetermined direction. For example, light including an s polarization and a p polarization is incident to the polarization beam splitter 6, and then p polarization light is emitted therefrom. The condenser lens 7 receives and collects the light emitted from the polarization beam splitter 6. The white light emitted from the condenser lens 7 is incident to the separation and synthesis optical system.

The separation and synthesis optical system separates the light beams coming from the condenser lens 7 into RGB (red, green and blue), spatially modulates the respective light beams using the reflective light modulation device 14 so as to be synthesized, and forms projection images using the emitted light. The separation and synthesis optical system includes a dichroic mirror 8, a dichroic mirror 9, a mirror (reflection mirror) 10, a field lens 11, a reflective polarization element 12, an optical compensation element 13, the reflective light modulation device 14, and a color synthesis prism 15. The reflective light modulation device 14 includes a reflective light modulation device 14R which spatially modulates the light beams in the red wavelength band, a reflective light modulation device 14G which spatially modulates the light beams in the green wavelength band, and a reflective light modulation device 14B which spatially modulates the light beams in the blue wavelength band.

The dichroic mirror 8 and the dichroic mirror 9 selectively transmit or reflect the respective light beams of RGB according to their wavelength bands. The dichroic mirror transmits the light beams in the red wavelength band and reflects the light beams in the green and blue wavelength bands. The dichroic mirror 9 transmits the light beams in the blue wavelength band, and reflects the light beams in the green wavelength band. Thereby, the white light beams are separated into the three colors of RGB. The mirror 10 reflects the light beams in the red wavelength band.

The light beams having undergone the color separation are respectively incident to the field lenses 11 and the reflective polarization elements 12, and the reflective light modulation device 14R, the reflective light modulation device 14G, and the reflective light modulation device 14B are respectively illuminated with the light beams.

The respective light beams of RGB having undergone light modulation in the reflective light modulation device 14R, the reflective light modulation device 14G, and the reflective light modulation device 14B undergo optical compensation (fine adjustment of phase modulation amount) in the optical compensation elements 13 and then are incident to the reflective polarization elements 12. The optical compensation element 13 is provided to have a predetermined tilt with respect to the reflective light modulation device 14 so as to achieve more preferable optical compensation. In addition, for the respective light beams of RGB incident to the reflective polarization elements 12, depending on a degree of the light modulation, some are transmitted through the reflective polarization elements 12 and then return towards the light source 2, and others are reflected and incident to the color synthesis prism 15. In addition, the optical compensation elements 13 use various kinds of materials such as, for example, sapphire, crystal, or TAC (triacetyl cellulose) as a material thereof.

The color synthesis prism 15 transmits the incident light beams in the green wavelength band and reflects the incident light beams in the red wavelength band and the blue wavelength band towards the projection lens 16. The color synthesis prism 15 is formed, for example, by joining a plurality of glass prisms (four isosceles right triangle prisms having roughly the same shape), and two interference filters having a predetermined optical characteristic are formed on a joined surface of each glass prism. The first interference filter reflects the incident light beams in the blue wavelength band and transmits the incident light beams in the red and green wavelength bands. The second interference filter reflects the incident light beams in the red wavelength band and transmits the incident light beams in the green and blue wavelength bands. Therefore, the respective light beams of RGB modulated by the reflective light modulation device 14R, the reflective light modulation device 14G, and the reflective light modulation device 14B are synthesized by the color synthesis prism 15, and then are incident to the projection lens 16.

The projection lens 16 magnifies the light beams emitted from the separation and synthesis optical system at a predetermined magnification, and projects images on a screen (not shown).

Figure 2:
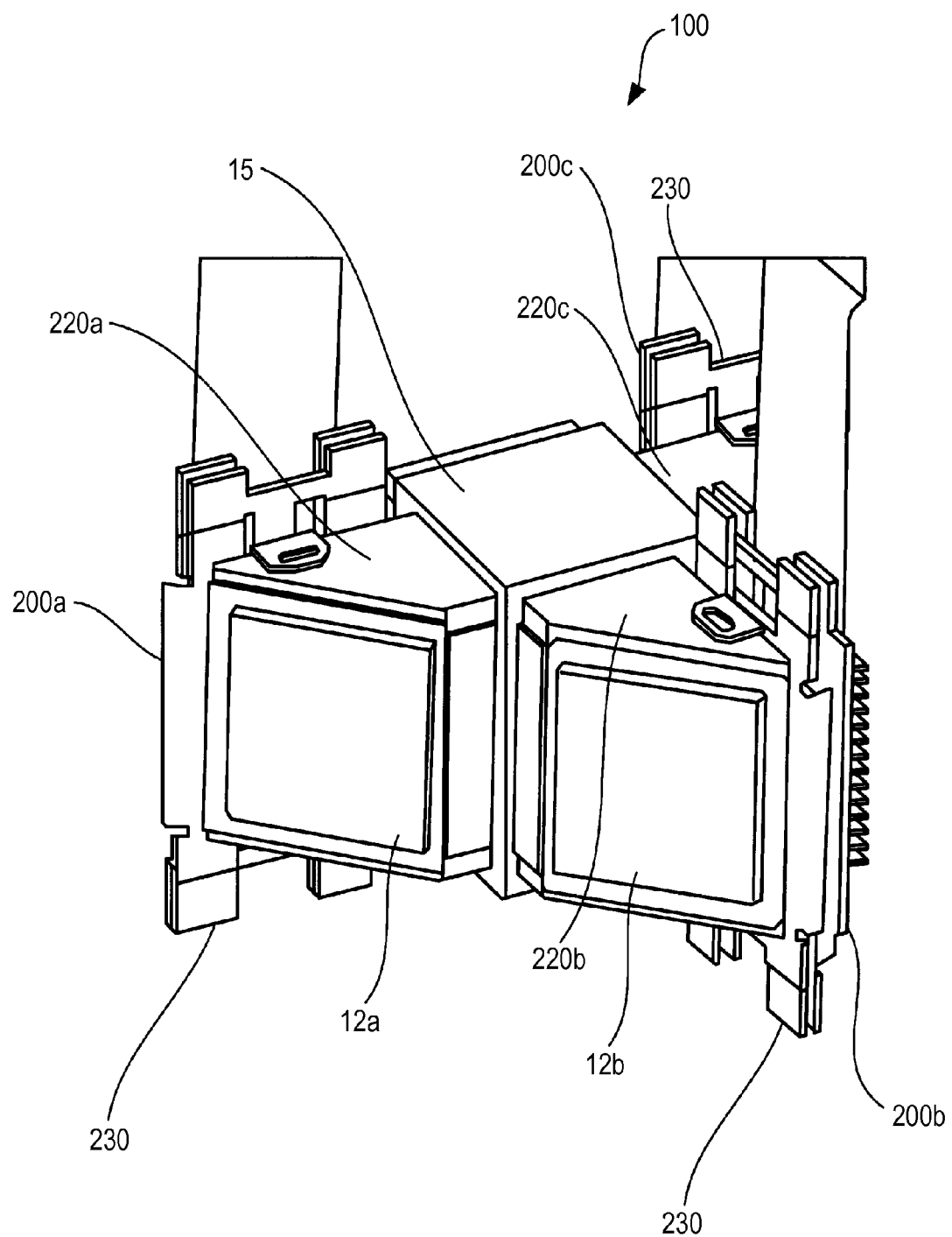
FIG. 2 is a perspective view of an optical device according to the first embodiment.

Next, an exterior of the optical device according to the first embodiment will be described with reference to FIG. 2. FIG. 2 is a perspective view of the optical device according to the first embodiment.

The optical device 100 includes the color synthesis prism 15, and fixing plates (fixing member) 220 fixed to three incidence surfaces of the color synthesis prism 15, the reflective polarization elements 12, reflection panels 200, and prism side brackets 230, respectively.

The color synthesis prism 15 has a cube shape or a cuboid shape, three of the four lateral surfaces are incidence surfaces of the respective light beams from the reflective light modulation device 14R, the reflective light modulation device 14G, and the reflective light modulation device 14B, and the remaining one is an emission surface of the synthesized light to the projection lens 16.

One (a first incidence surface) of the three incidence surfaces of the color synthesis prism 15 is joined to the fixing plate 220a made of, for example, a glass material, and the first reflective polarization element 12a and the first reflection panel (a first light modulation unit) 200a can be installed in the fixing plate 220a. Another (a second incidence surface) of the three incidence surfaces of the color synthesis prism 15 is joined to the fixing plate 220b and the second reflective polarization element 12b and the second reflection panel (a second light modulation unit) 200b can be installed in the fixing plate 220b. The last (a third incidence surface) of the three incidence surfaces of the color synthesis prism 15 is joined to the fixing plate 220c and the third reflective polarization element 12c (not shown) and the third reflection panel (a third light modulation unit) 200c can be installed in the fixing plate 220c.

In addition, in the color synthesis prism 15, a surface which is perpendicular to the first incidence surface and the third incidence surface and is opposite to the second incidence surface forms the emission surface of synthesized light.

The fixing plates 220 has roughly triangular plate shapes, two of which are joined to upper and lower edges of one incidence surface of the color synthesis prism 15 and form upper bottom and lower bottom sides of a roughly triangular pole. The roughly triangular pole has one of three lateral surfaces coming into contact with the color synthesis prism 15, another lateral surface coming into contact with the reflective polarization element 12, and the last lateral surface holding the reflection panel 200. The reflection panels 200 can be installed in the fixing plates 220 via the prism side brackets 230 so as to exchange their units.

Figure 3:
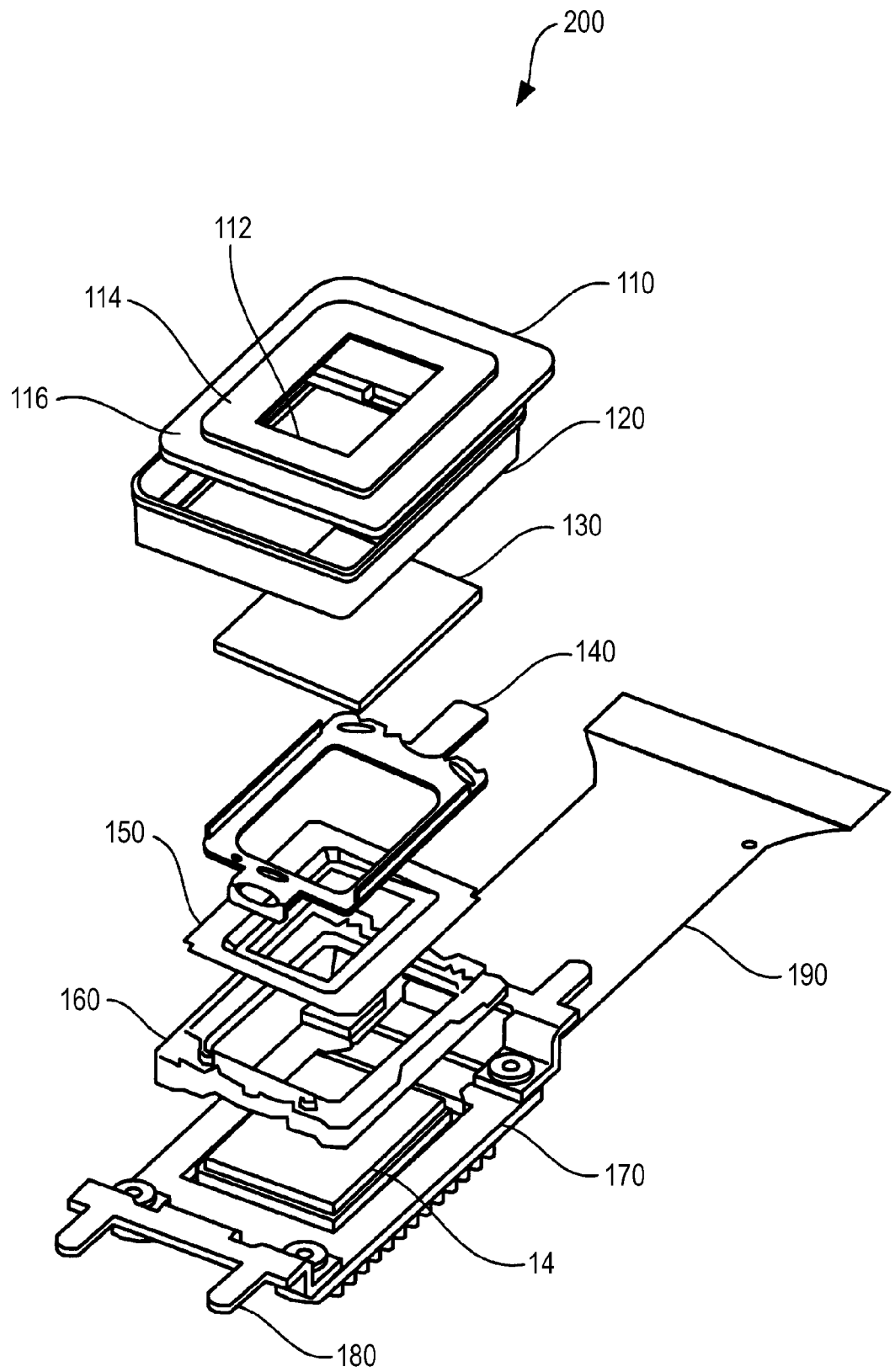
FIG. 3 is an exploded perspective view of a reflection panel according to the first embodiment.

Next, a configuration of the reflection panels 200 according to the first embodiment will be described with reference to FIG. 3. FIG. 3 is an exploded perspective view of the reflection panel according to the first embodiment.

The reflection panels 200 include the first reflection panel 200a which modulates light beams in the blue wavelength band, the second reflection panel 200b which modulates light beams in the green wavelength band, and the third reflection panel 200c which modulates light beams in the red wavelength band.

The reflection panel 200 includes a light blocking plate 110, an anti-dust rubber 120, an optical compensation plate 130, an optical compensation plate holder 140, a panel surface active area light blocking plate 150, a panel cover 160, a reflective light modulation device 14, a panel holder 170, a soldering plate 180, and a flexible printed board 190.

The reflective light modulation device 14 is connected to the flexible printed board 190 and is held by the panel holder 170. The panel holder 170 is connected to the soldering plate 180 at both ends which is longitudinally positioned when they are assembled. The panel holder 170 holds the panel cover 160.

The panel cover 160 is a frame surrounding the outer periphery of the reflective light modulation device 14, and is mounted with the panel surface active area light blocking plate 150 and the optical compensation plate holder 140 on the frame. The optical compensation plate holder 140 holds the optical compensation plate (optical compensation element) 130. The anti-dust rubber 120 is a frame surrounding the optical compensation plate 130, the optical compensation plate holder 140, the panel surface active area light blocking plate 150, the panel cover 160, and the reflective light modulation device 14. The anti-dust rubber 120 is an elastic body made of rubber, the bottom surface of which comes into contact with the panel holder 170, the frame upper surface of which comes into contact with the light blocking plate 110 in such a manner that the light blocking plate 110 covers the upper surface, and thus prevents dust from entering the inside of the frame from a peripheral environment. The light blocking plate 110 is a frame having a light blocking plate aperture 112, and the frame includes a base portion 116 and a light blocking portion 114. The light blocking portion 114 stands from and is positioned one level higher than the base portion 116.

Figure 4:
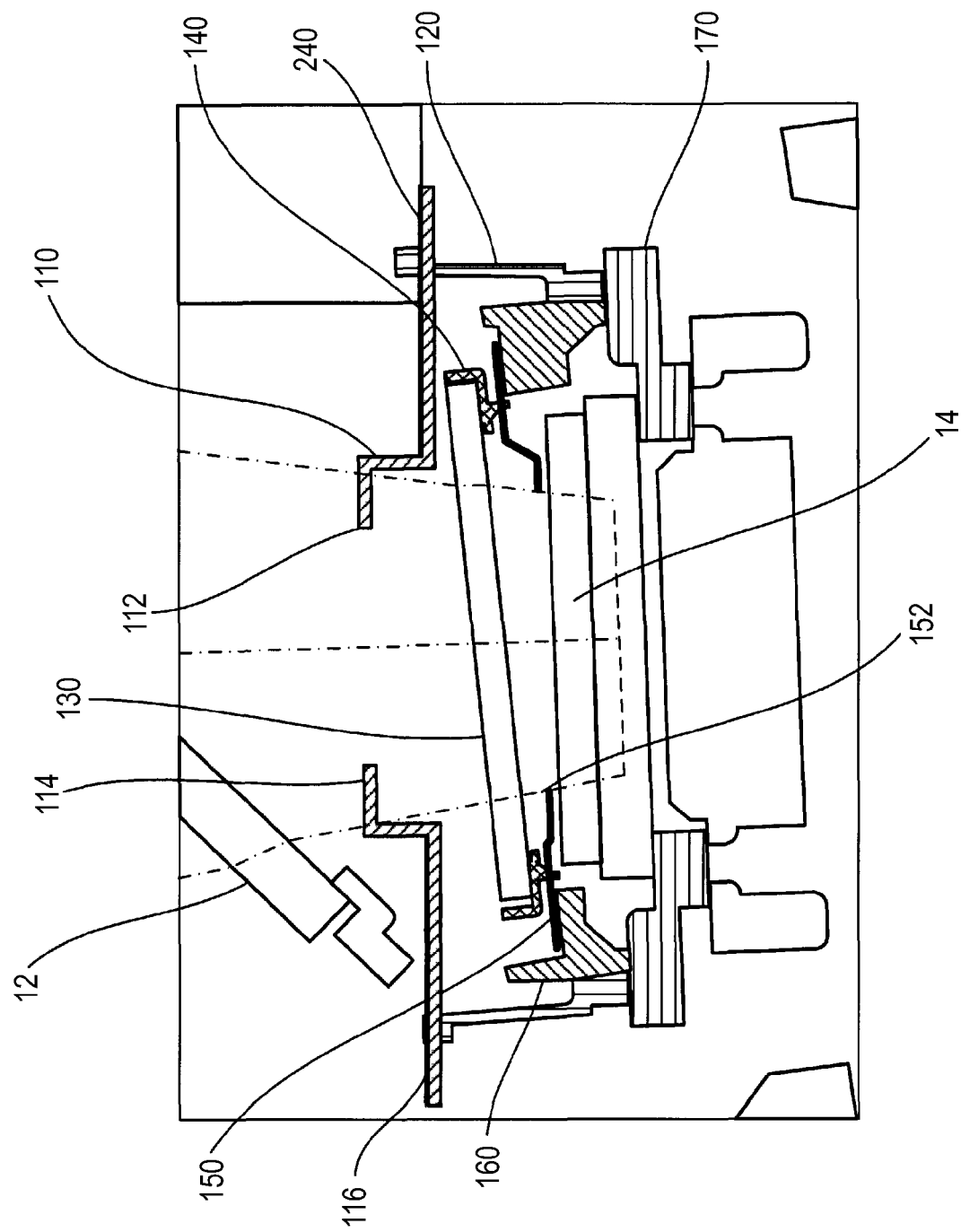
FIG. 4 is a partial cross-sectional view of the optical device according to the first embodiment.

Next, a positional relationship when the reflection panel 200 according to the first embodiment is assembled will be described with reference to FIG. 4. FIG. 4 is a partial cross-sectional view of the optical device according to the first embodiment.

A portion of light beams transmitted through the reflective polarization element 12 are blocked by the light blocking plate (prism side light blocking plate) 110. A temperature of the light blocking plate 110 is increased by blocking the transmitted light from the reflective polarization element 12. The increase in the temperature of the light blocking plate 110 generates radiation heat in the light blocking plate 110 and in turn increases a temperature of the base material of the optical compensation plate 130. The optical compensation plate 130 induces local birefringence due to the increase in the temperature of the base material, and thus quality of projected images is deteriorated. For example, when black images are displayed or images in a middle grayscale are displayed, luminance unevenness occurs in the projected images.

For this reason, the light blocking plate 110 blocks light transmitted from the reflective polarization element 12 using the light blocking portion 114 positioned higher than the base portion 116, where a gap between the light blocking portion 114 and the optical compensation plate 130 is made to be large. Around the light blocking plate aperture 112, making the distance between the light blocking portion 114, of which a temperature greatly increases in the light blocking plate 110 and the optical compensation plate 130, large contributes to the effect of suppressing the temperature of the optical compensation plate 130 from increasing and preventing quality of projected images from being deteriorated.

In addition, the light blocking plate 110 is installed in the prism side bracket (prism side plate) 230 described later via a heat insulator 240. Thereby, heat in the reflection panel 200 side including the light blocking plate 110 is insulated and is suppressed from being transmitted to the prism side bracket 230 and the fixing plate 220 side. The suppression of heat from being transmitted to the prism side bracket 230 and the fixing plate 220 side contributes to reducing the registration shift caused by heat reception of the assembly forming the reflective liquid crystal devices.

The transmitted light beams from the reflective polarization element 12, which have passed the light blocking plate aperture 112, are transmitted through the optical compensation plate 130, and then a portion thereof are blocked by the panel surface active area light blocking plate (panel side light blocking plate) 150. The panel surface active area light blocking plate 150 blocks the incident light beams from reaching the reflective light modulation device 14 around the reflective light modulation device 14 and limits a range in which light is incident to the reflective light modulation device 14 to a panel surface active area light blocking plate aperture 152.

The light blocking plate aperture 112 is smaller than the panel surface active area light blocking plate aperture 152, and the light blocking portion 114 suppresses unnecessary light from reaching the reflective light modulation device 14 in front of the panel surface active area light blocking plate 150. In other words, the light blocking portion 114 limits the light reaching the reflective light modulation device 14 to passing light which passes the light blocking plate aperture 112. The suppression of unnecessary light by the light blocking plate aperture 112 suppresses a temperature of the reflective light modulation device 14 and the vicinity thereof (for example, the panel surface active area light blocking plate 150) from increasing.

The suppression of the increase in the temperature of the reflective light modulation device 14 and the vicinity thereof suppresses a temperature of the adhesive which suppresses the reflective light modulation device 14 from increasing, and reduces the registration shift due to the variation in a fixed position of the reflective light modulation device 14 by the linear expansion in the adhesive.

In addition, the suppression of the increase in the temperature of the reflective light modulation device 14 and the vicinity thereof reduces cooling capacity necessary for the reflection panel 200. The reduction in the necessary cooling capacity contributes to the improvement in silencing due to reduction in driving characteristics of a cooling fan, reduction in power consumption, and reduction in a volume of the reflection panel 200 or the like resulting from reduction in capacity of a heat sink.

In addition, the suppression of unnecessary light by the light blocking plate aperture 112 reduces light incident to the outside of the panel surface active area and peripheral component thereon (for example, the panel surface active area light blocking plate 150) and reduces reflection and scattering of the unnecessary light. The reduction in the reflection and the scattering of the unnecessary light contributes to improvement of contrast performance of the optical system.

The reflected light (modulated light) which is modulated by the reflective light modulation device 14 passes the panel surface active area light blocking plate aperture 152 and then is transmitted through the optical compensation plate 130 and passes the light blocking plate aperture 112. At this time, the light blocking plate aperture 112 functions as a clearout plate for the modulated light, and restricts light emitted from the reflection panel 200. Due to the restriction of the emitted light, patterns outside the panel surface active area such as dust existing in an area other than the panel surface active area, inner defects of transparent components, scratches, or the like are prevented from being projected as they are, and thus it is possible to improve image quality. At this time, a shape of the edge portion of the light blocking plate aperture 112 is processed so as not to generate stray light, and thus it is possible to further improve the image quality.

Figure 5:
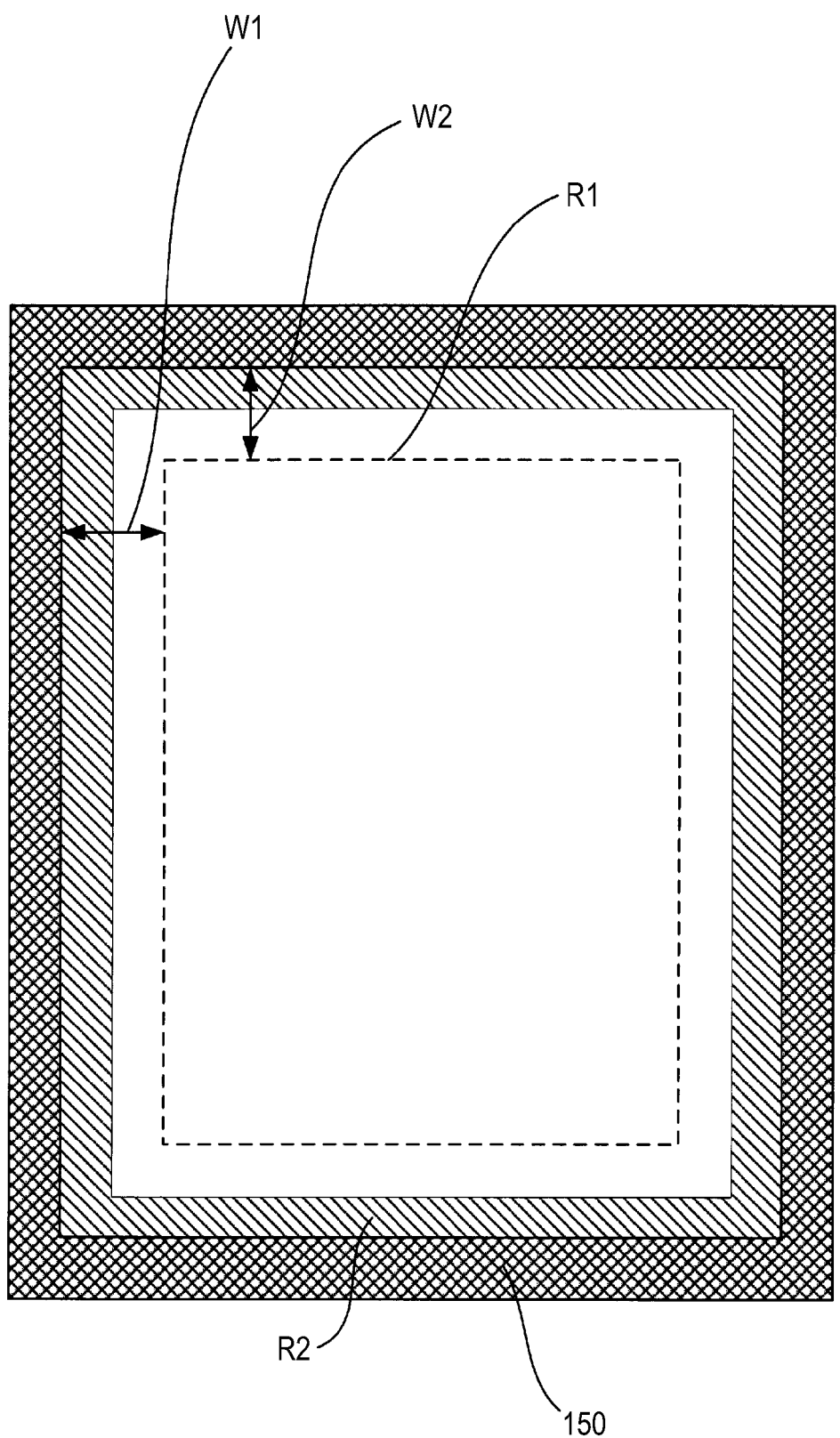
FIG. 5 is a diagram of when a reflective light modulation device is seen from the front side of a panel surface active area light blocking plate according to the first embodiment.

Next, a relationship between an area which the light blocking plate aperture 112 blocks light from reaching and an area which the panel surface active area light blocking plate aperture 152 blocks light from reaching will be described with reference to FIG. 5. FIG. 5 is a diagram when the reflective light modulation device is seen from the front side of the panel surface active area light blocking plate according to the first embodiment.

The panel surface active area light blocking plate 150 allows light to enter a pixel active area R1 (panel surface active area) of the reflective light modulation device 14 by blocking light from reaching the periphery thereof. The pixel active area R1 has a rectangular shape, and the panel surface active area light blocking plate aperture 152 is opened in the rectangular shape with the size having a marginal amount in illumination range W1 in the transverse direction and a marginal amount in illumination range W2 in the longitudinal direction with respect to the pixel active area R1. In other words, the panel surface active area light blocking plate aperture 152 is opened with a predetermined marginal area in the pixel active area R1 of the reflective light modulation device 14.

The light blocking plate 110 blocks light from reaching the peripheral area (the light blocking plate light blocking area R2) such that the pixel active area R1 is irradiated with light. The light blocking plate light blocking area R2 has a rectangular shape which is larger than the pixel active area R1 and smaller than the panel surface active area light blocking plate aperture 152. In this way, the light blocking plate light blocking area R2 is set to a size within a range of the marginal amount in an illumination range.

Figure 6:
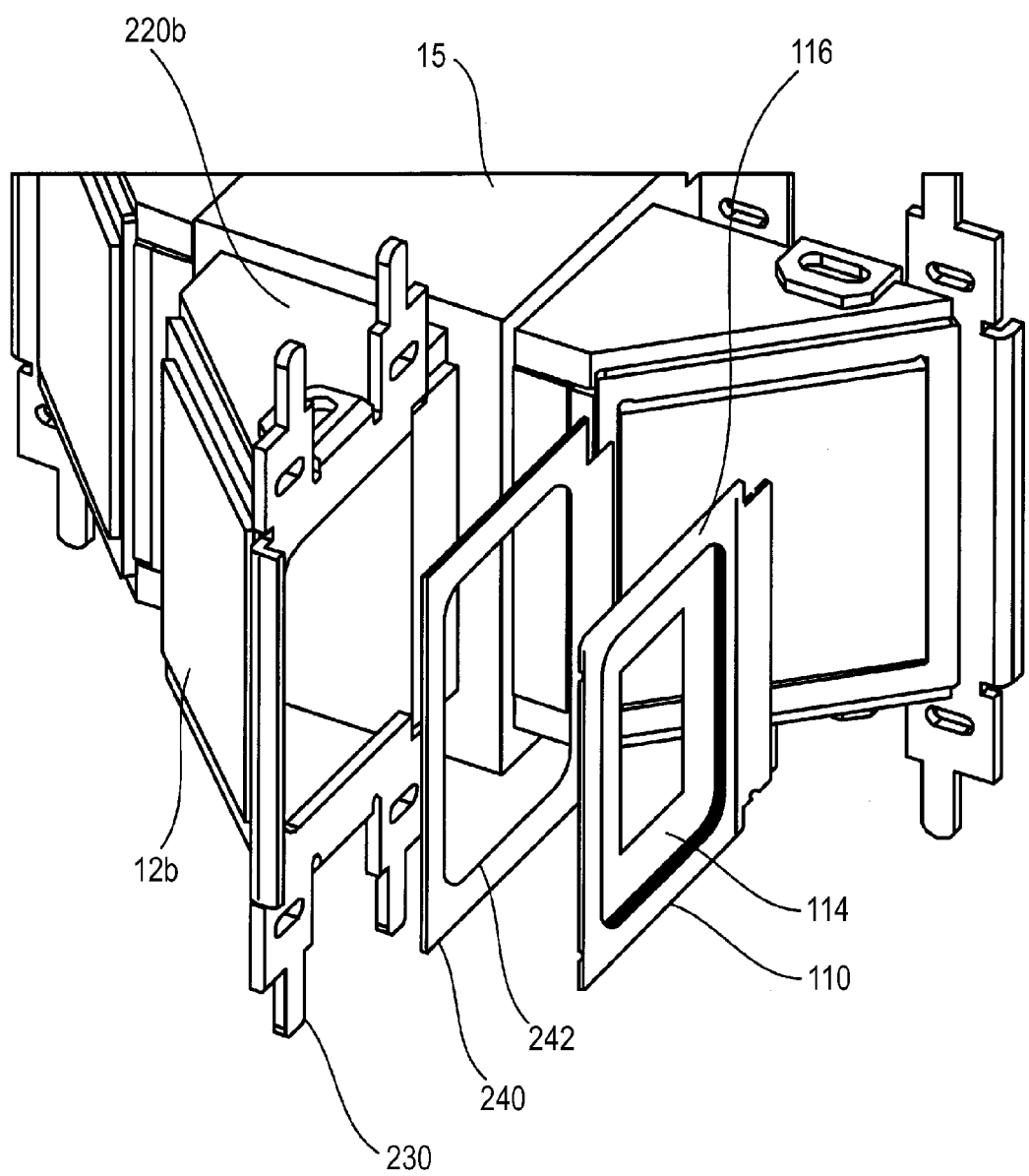
FIG. 6 is a diagram illustrating a state where the light blocking plate is installed in the optical device according to the first embodiment.

Next, installation of the light blocking plate 110 in the prism side bracket (prism side plate) 230 will be described with reference to FIG. 6. FIG. 6 is a diagram illustrating a state where the light blocking plate is installed in the optical device according to the first embodiment.

The installation of the color synthesis prism 15 of the second reflection panel 200b of the reflection panels 200 is performed by installing the second reflection panel 200b in the prism side bracket 230 held by the fixing plate 220b. At this time, the light blocking plate 110 of the second reflection panel 200b is installed in the prism side bracket 230 via the heat insulator 240. The heat insulator 240 has roughly the same shape as the light blocking portion 114 and a heat insulator aperture 242 slightly larger than the light blocking portion 114.

The heat insulator (heat insulating member) 240 is a hard heat insulating plate which uses a heat resistance material (for example, glass fiber, cement, mica, or the like) as a main material. The thickness of the heat insulator 240 is equal to or lower than the height of the light blocking portion 114 standing from the base portion 116, and the light blocking portion 114 is inserted into a heat insulator aperture 242 and comes into contact with the base portion 116. Thereby, heat from the reflection panel 200 side including the light blocking plate 110 is insulated and thus is suppressed from being transmitted to the prism side bracket 230 and the fixing plate 220 side. The suppression of heat from being transmitted to the prism side bracket 230 and the fixing plate 220 side contributes to reducing the registration shift caused by heat reception of the assembly forming the reflective liquid crystal devices.

Although the installation of the second reflection panel 200b of the reflection panels 200 in the color synthesis prism 15 has been described, this is the same as cases of installation of the first reflection panel 200a and the third reflection panel 200c.

Figure 7:
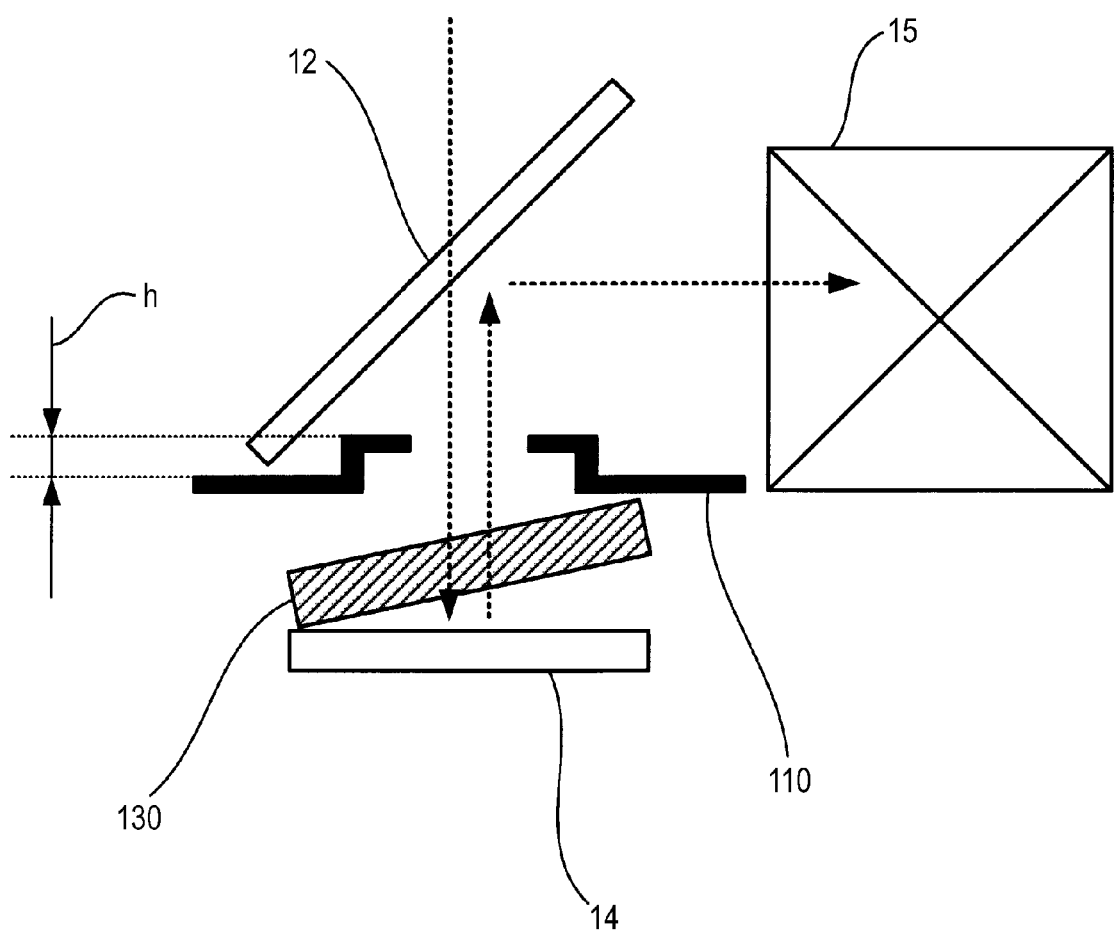
FIG. 7 is a schematic diagram illustrating a position where the light blocking plate is installed according to the first embodiment.

Next, a relationship between the light blocking plate 110, the optical compensation plate 130, the reflective light modulation device 14, the reflective polarization element 12, and the color synthesis prism 15 will be described with reference to FIG. 7. FIG. 7 is a schematic diagram illustrating a position where the light blocking plate according to the first embodiment is installed.

The light blocking plate 110 may be provided roughly parallel to the reflective light modulation device 14. The light blocking plate 110 is in a stepwise state in which there is a step difference of the height h in the cross section. Due to the step difference of the light blocking plate 110, the light blocking portion 114 is close to the reflective polarization element 12 and is spaced apart from the optical compensation plate 130. The height h of the step difference may be arbitrarily set in a range so as not to interfere with the reflective polarization element 12, the color synthesis prism 15, and the light path. In addition, the step difference is not limited to one step but may be two steps or more.

The step difference of the light blocking plate 110 makes the light blocking plate 110 more efficiently dissipate heat by increasing a contact area of the light blocking plate 110 with the atmosphere. In addition, the light blocking plate 110 may appropriately use materials having high heat dissipation efficiency such as, for example, aluminum. In addition, the light blocking plate 110 may increase a contact area with the atmosphere with a fin structure.

Figure 8:
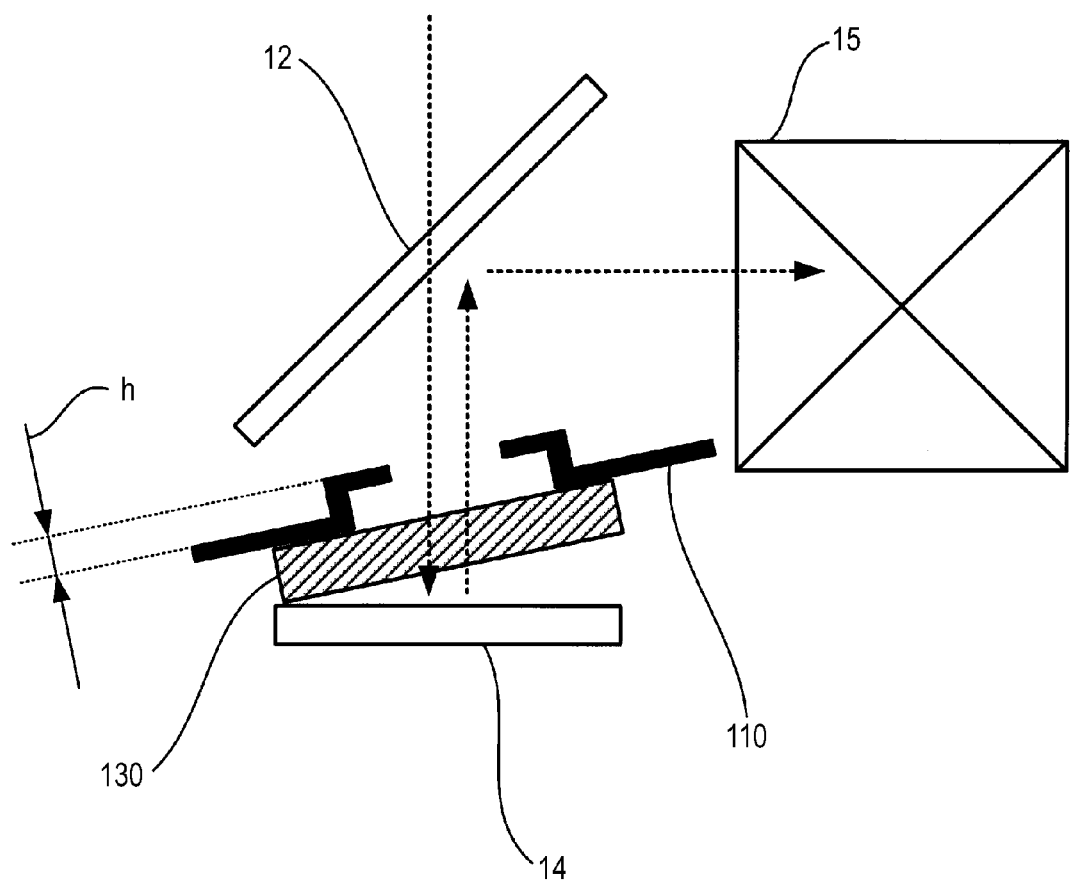
FIG. 8 is a schematic diagram illustrating a position where a light blocking plate is installed according to a second embodiment.

Next, as a modified example of the first embodiment, a second embodiment in which a position of the installation of the light blocking plate 110 is changed will be described. FIG. 8 is a schematic diagram illustrating a position where the light blocking plate is installed according to the second embodiment.

The light blocking plate 110 may be provided roughly parallel to the optical compensation plate 130. The light blocking plate 110 is in a stepwise state in which there is a step difference of the height h in the cross section. Due to the step difference of the light blocking plate 110, the light blocking portion 114 is close to the reflective polarization element 12 and is spaced apart from the optical compensation plate 130. The height h of the step difference may be arbitrarily set in a range so as not to interfere with the reflective polarization element 12, the color synthesis prism 15, and the light path. In addition, the step difference is not limited to one step but may be two steps or more.

In this case, the height h of the step difference can be set to a larger value since the base portion 116 of the light blocking plate 110 is retreated (spaced apart) from the reflective polarization element 12. At this time, the height h of the step difference is not equal over the outer periphery of the light blocking portion 114, but may be set to a small value in the color synthesis prism 15 side. In other words, the light blocking portion 114 of the light blocking plate 110 is provided to be tilted with respect to the base portion 116 in a direction of a decreasing slope with the reflective polarization element 12.

Figure 9:
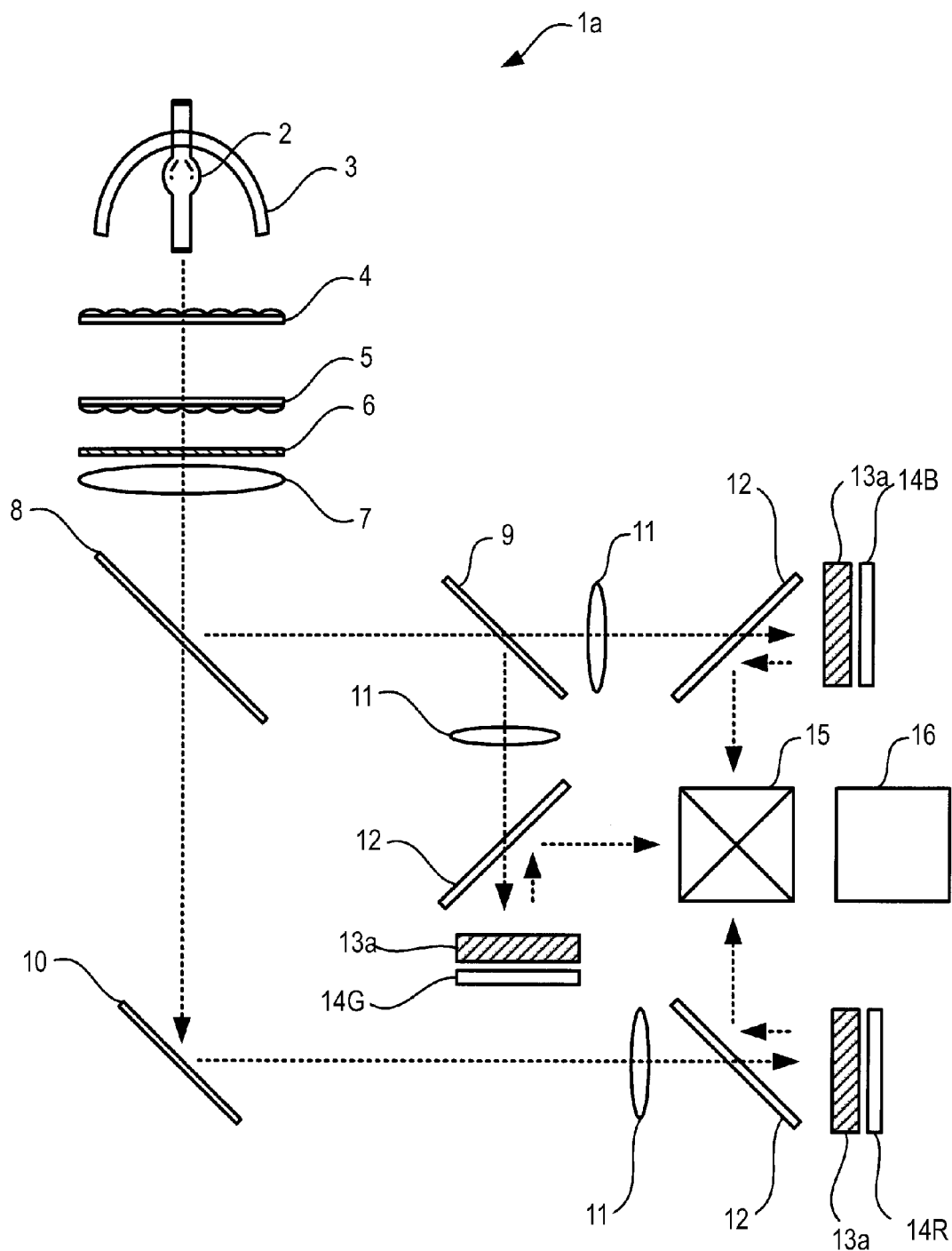
FIG. 9 is a diagram illustrating a configuration example of a reflective liquid crystal projector according to a third embodiment.

Next, as a modified example of the first embodiment, a third embodiment in which an angle of the installation of the optical compensation plate is changed will be described with reference to FIG. 9. FIG. 9 is a diagram illustrating a configuration example of a reflective liquid crystal projector according to a third embodiment. The same components in the first embodiment are given the same reference numerals and the description thereof will be omitted.

In the third embodiment, unlike in the first embodiment, an optical compensation element 13a is provided roughly parallel to the reflective light modulation device 14 forming a pair. Three optical compensation elements 13a are provided corresponding to the respective incidence surfaces of the color synthesis prism 15 and respectively form pairs with the reflective light modulation device 14R, the reflective light modulation device 14G, and the reflective light modulation device 14B.

The optical compensation elements 13 are provided roughly parallel to the reflective light modulation devices 14 forming a pair in order to obtain more preferable optical compensation. In addition, the optical compensation elements are provided roughly parallel for sufficient optical compensation, easy assembling, and other reasons.

Figure 10:
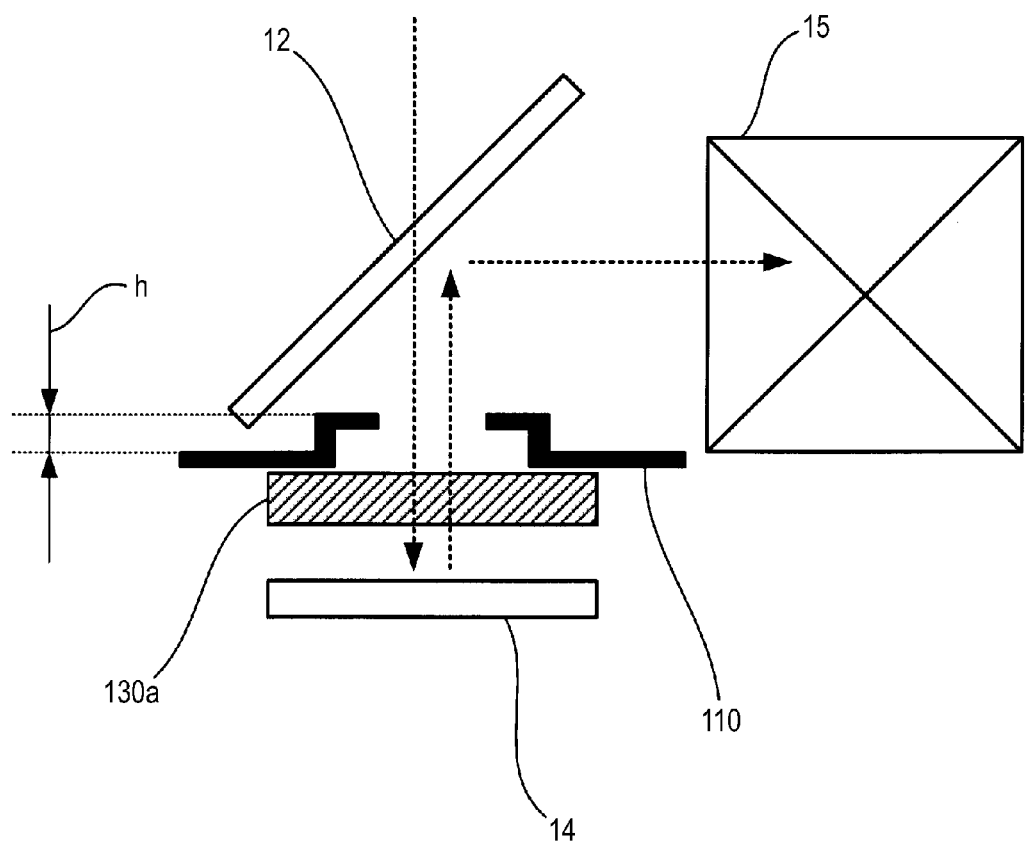
FIG. 10 is a schematic diagram illustrating a position where a light blocking plate is installed according to a third embodiment.

Next, a relationship between the light blocking plate 110, the optical compensation plate (optical compensation element) 130, the reflective light modulation device 14, the reflective polarization element 12, and the color synthesis prism 15 will be described with reference to FIG. 10. FIG. 10 is a schematic diagram illustrating a position where the light blocking plate is installed according to the third embodiment.

The light blocking plate 110 may be provided roughly parallel to the optical compensation plate 130a and the reflective light modulation device 14. The light blocking plate 110 is in a stepwise state in which there is a step difference of the height h in the cross section. Due to the step difference of the light blocking plate 110, the light blocking portion 114 is close to the reflective polarization element 12 and is spaced apart from the optical compensation plate 130. The height h of the step difference may be arbitrarily set in a range so as not to interfere with the reflective polarization element 12, the color synthesis prism 15, and the light path. In addition, the step difference is not limited to one step but may be two steps or more.

Figure 11:
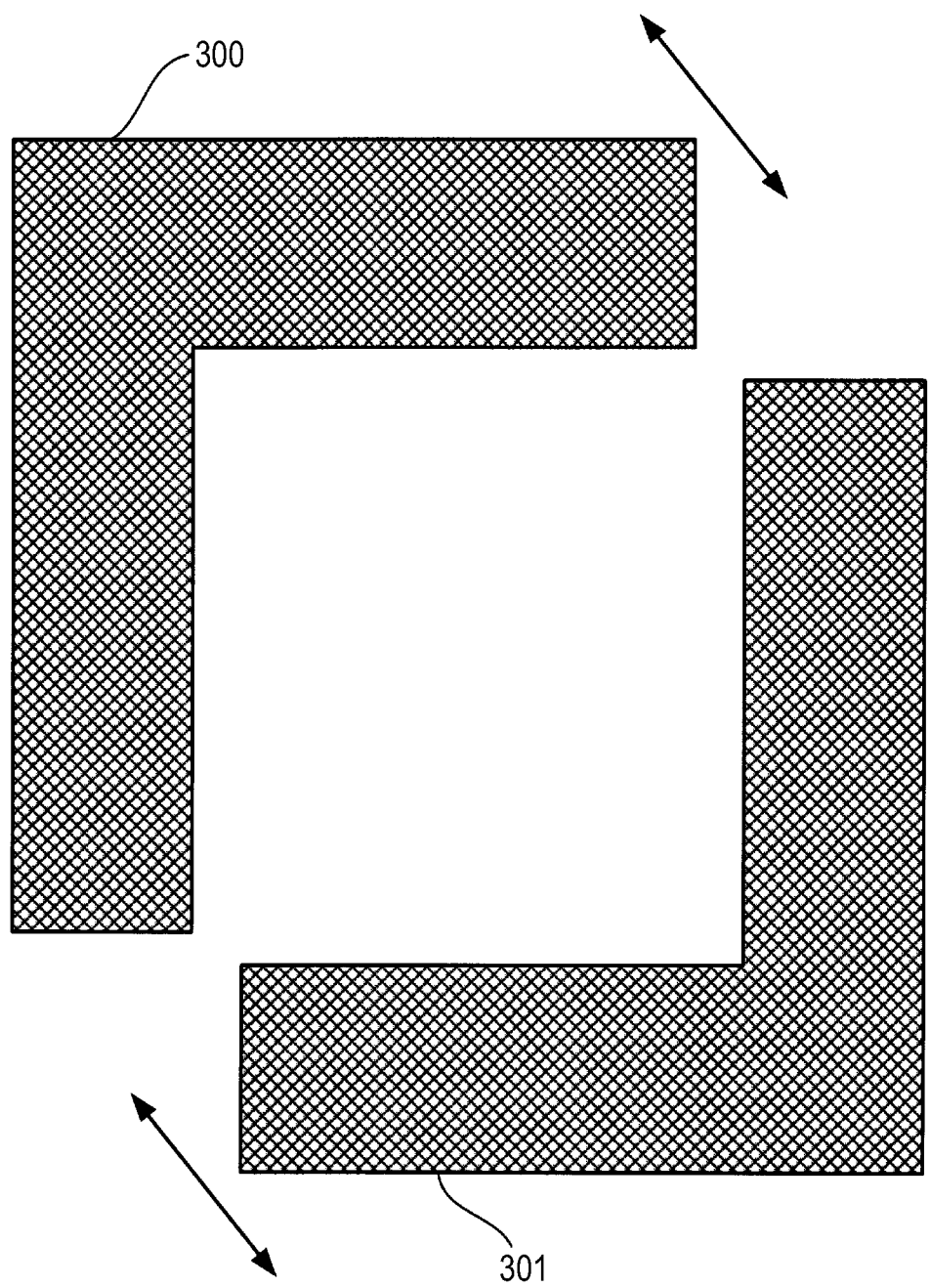
FIG. 11 is a diagram illustrating a light blocking shutter according to a fourth embodiment.
Figure 12:
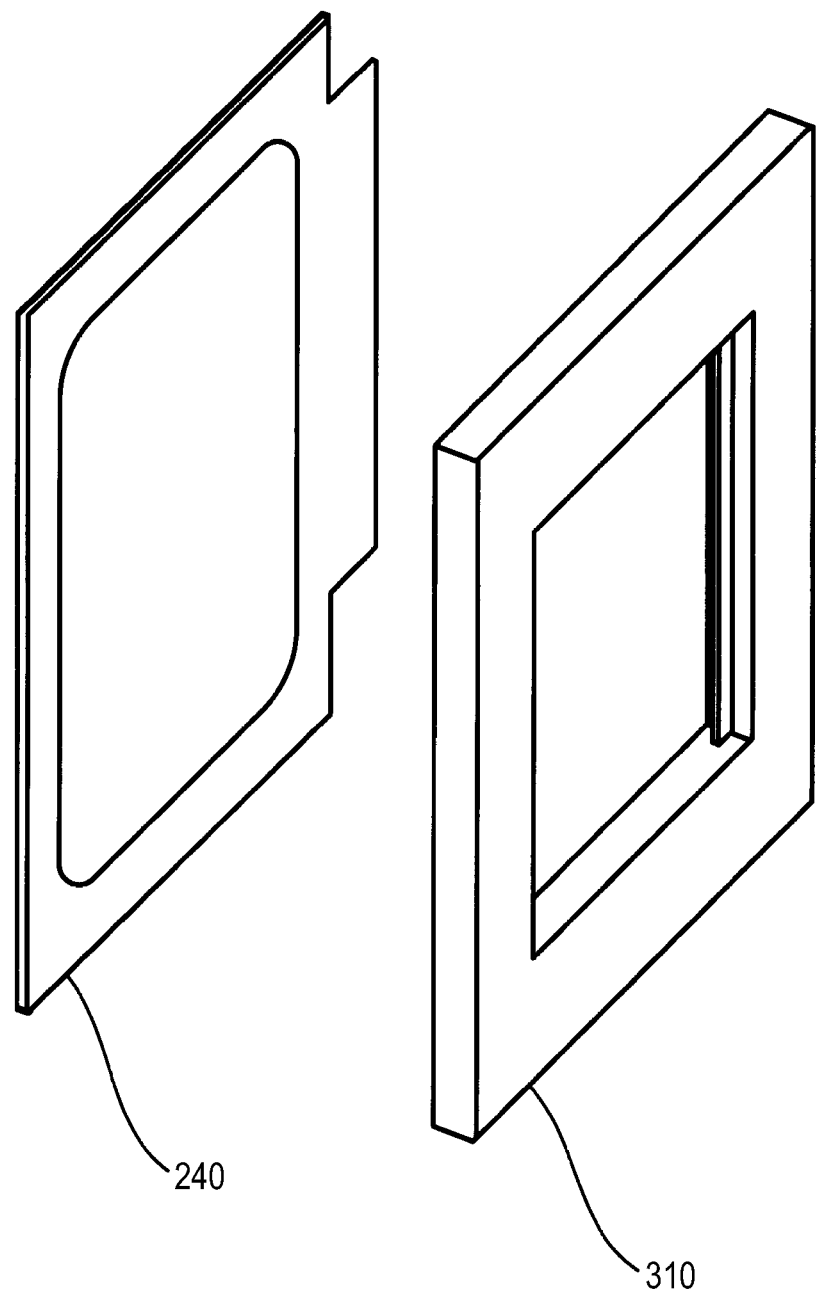
FIG. 12 is a perspective view illustrating a light blocking plate holder and a heat insulator in a state where the light blocking shutter according to the fourth embodiment is opened.
Figure 13:
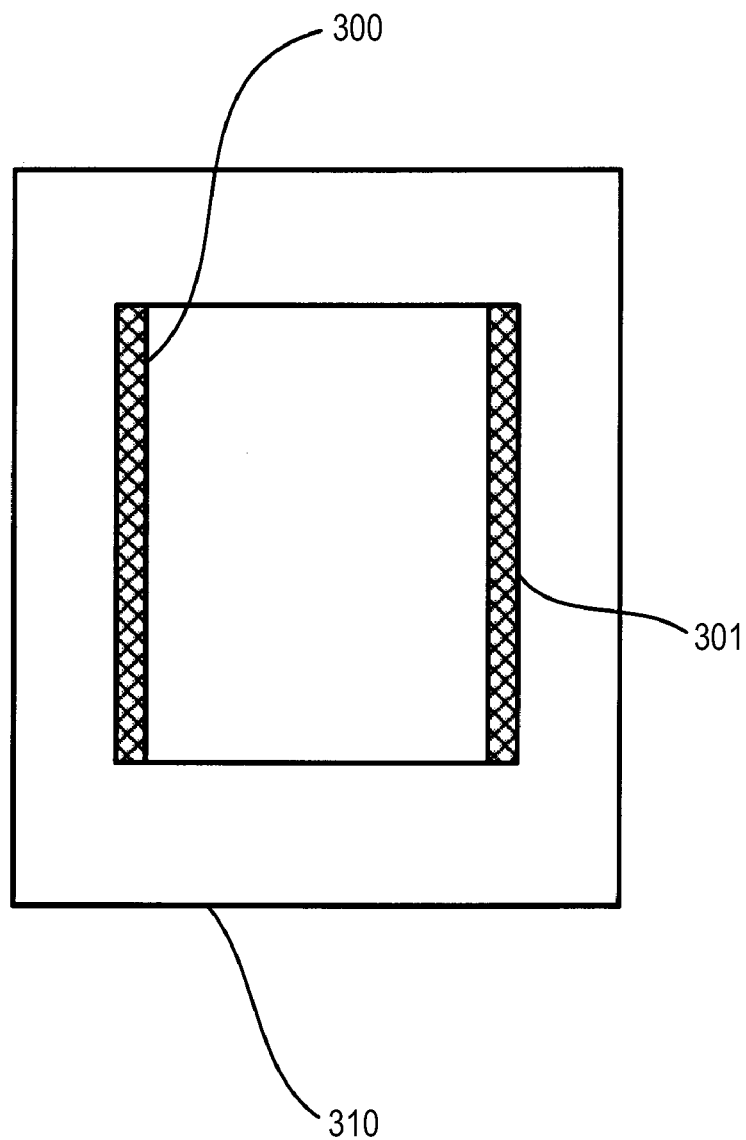
FIG. 13 is a diagram of when the light blocking plate holder is seen from the front side in the opened state of the light blocking shutter according to the fourth embodiment.
Figure 14:
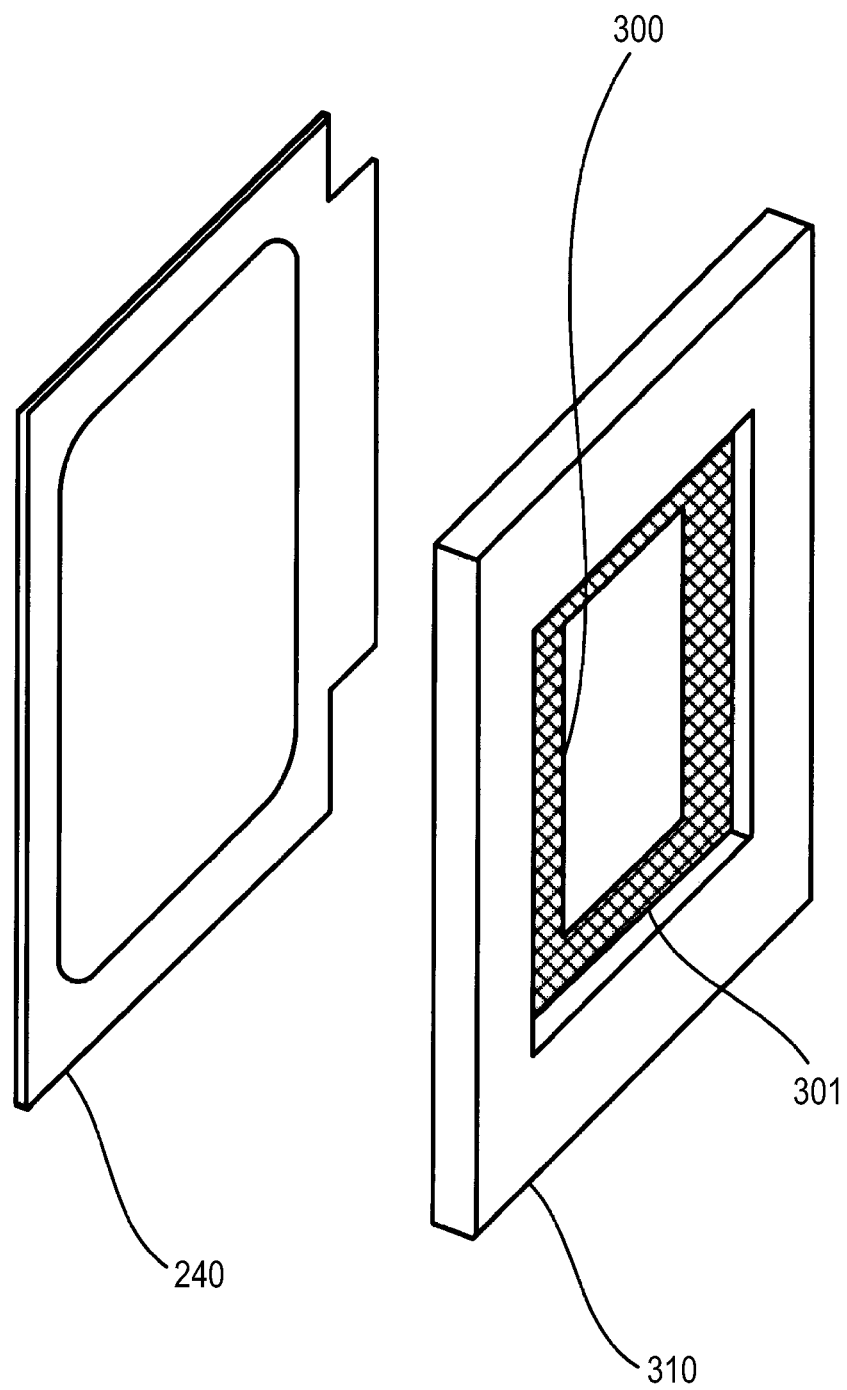
FIG. 14 is a perspective view illustrating the light blocking plate holder and the heat insulator in a state where the light blocking shutter according to the fourth embodiment is closed.
Figure 15:
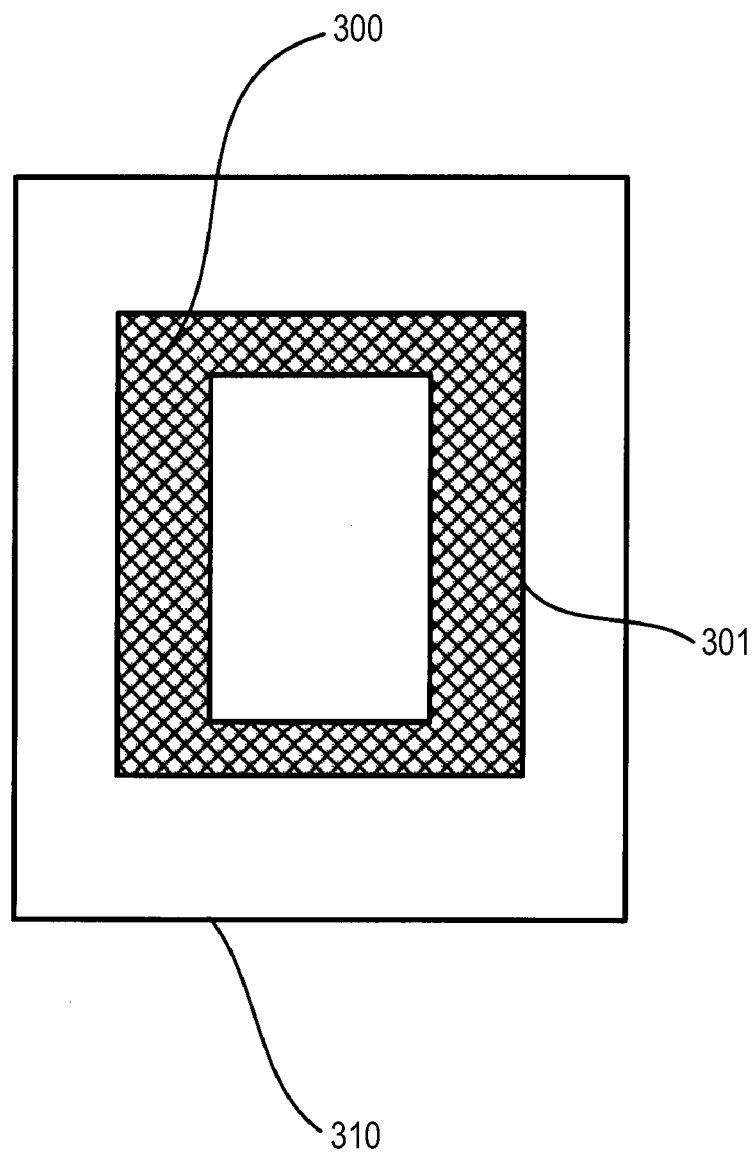
FIG. 15 is a diagram of when the light blocking plate holder is seen from the front side in the closed state of the light blocking shutter according to the fourth embodiment.

Next, a fourth embodiment in which a light blocking shutter is provided instead of the light blocking plate will be described with reference to FIGS. 11 to 15. FIG. 11 is a diagram illustrating a light blocking shutter according to a fourth embodiment. FIG. 12 is a perspective view illustrating a light blocking plate holder and a heat insulator in a state where the light blocking shutter according to the fourth embodiment is opened. FIG. 13 is a diagram when the light blocking plate holder is seen from the front side in the opened state of the light blocking shutter according to the fourth embodiment. FIG. 14 is a perspective view illustrating the light blocking plate holder and the heat insulator in a state where the light blocking shutter according to the fourth embodiment is closed. FIG. 15 is a diagram when the light blocking plate holder is seen from the front side in the closed state of the light blocking shutter according to the fourth embodiment. The same components in the first embodiment are given the same reference numerals and the description thereof will be omitted.

A light blocking shutter 300 and a light blocking shutter 301 have an L shape and also plate-shaped members, which are held by a light blocking plate holder 310 and form an aperture area variable mechanism. The light blocking shutter 300 and the light blocking shutter 301 slide in the direction marked with the arrows in FIG. 11 and change the size of the light blocking portion aperture.

The light blocking shutter 300 and the light blocking shutter 301 can change between an opened state (refer to FIGS. 12 and 13) and a closed state (refer to FIGS. 14 and 15). At this time, the light blocking shutter 300 and the light blocking shutter 301 are moved together and can be stopped at arbitrary positions in a movable range.

Thereby, the adjustment of an amount of light which has been performed by installing the light blocking plate within the fly-eye lens group can be performed by the light blocking shutter 300 and the light blocking shutter 301. The light blocking using the light blocking shutter 300 and the light blocking shutter 301 reduces influence of heat as compared with the light blocking performed by installing the light blocking plate within the fly-eye lens group, and thus, for example, the lifetime of the machine is improved in a case where, for example, a light blocking shutter opening and closing control mechanism is formed.

In addition, the light blocking shutter sets the pixel active area R1 (panel surface active area) to be reduced in a case where the reflective light modulation device 14 having a large number of pixels performs display with a small number of pixels (for example, a resolution of 1024×768 is set to a resolution of 640×480). The light blocking shutters block light from reaching unnecessary parts (the pixel area) which are not used to perform display. Therefore, due to the variable control of the light blocking shutters, when the display is performed with a small number of pixels, it is possible to further suppress the increase in a temperature of the optical compensation plate 130 and to prevent the deterioration in quality of projected images such as luminance unevenness. In addition, due to the variable control of the light blocking shutters, it is possible to further suppress the increase in a temperature of the reflective light modulation device 14 and to prevent the deterioration in quality of projected images such as the registration shift.

In addition, the light blocking shutters are not limited to the L shape but may have an arbitrary shape. In addition, the light blocking shutters are not limited to two plate-shaped members but may be formed of a plurality of plates (for example, four plates).

In the light blocking shutter 300 and the light blocking shutter 301, the size of the aperture may be manually adjusted, and the opening and closing control may be performed through a light blocking shutter moving actuator (for example, a driving motor, or a driving solenoid).

In addition, the light blocking shutters may change between an opened state and a complete light blocking state. Such light blocking shutters perform complete light blocking when black display is desired to be performed, and thus it is possible to easily perform high definition black display. Here, the complete light blocking state is a state where passing light which passes the light blocking shutters is limited to 0 by removing the aperture portion of the light blocking shutters.

In addition, the light blocking shutters may be replaced with a plurality of light blocking plates different from each other in the size of the light blocking portion aperture. Further, a plurality of light blocking portion apertures different from each other in size are provided in a single light blocking plate, and the light blocking portion apertures may be changed. Also, the light blocking shutters may be plate-shaped members standing from the light blocking plate holder 310, and the size of the light blocking portion aperture can be changed by changing a slope (standing angle) of the light blocking shutters.

The light blocking shutters may be used along with the light blocking plate positioned within the fly-eye lens group. In this case, more preferable light blocking can be performed corresponding to the combination of an amount of light and the number of pixels.

In addition, the above-described embodiments may be variously modified without departing from the scope of the embodiments.

Further, the above-described embodiments can be variously modified and altered by a person skilled in the art and thus are not limited to the exact configurations and applications described above.

What is claimed is:

1. An optical device comprising:
   a light synthesis prism that synthesizes incident light beams which are incident to a plurality of incidence surfaces and outputs the synthesized light beams;
   a light modulation unit that includes an optical compensation element and a reflective light modulation device; and
   a fixing member that fixes a reflective polarization element and the light modulation unit to the light synthesis prism so as to correspond to one of the incidence surfaces,
   wherein the light modulation unit includes
   a light blocking member that blocks light from reaching the light modulation unit and limits light with which the optical compensation element and the reflective light modulation device are irradiated, to light passing an aperture portion; and
   a heat insulating member that comes into contact with the light blocking member and the fixing member,
   wherein the light blocking member includes:
   a heat insulating member contact portion that comes into contact with the heat insulating member; and
   a light blocking portion that has the aperture, and
   wherein the light blocking portion and the heat insulating member contact portion have a step difference of a predetermined height.

2. The optical device according to claim 1, wherein the height of the step difference is larger than a thickness of the heat insulating member.

3. The optical device according to claim 1, wherein the light modulation unit includes a second light blocking member that limits light with which the reflective light modulation device is irradiated, to light passing a second aperture portion, in a position adjacent to the optical compensation element,
   wherein the second aperture portion forms a predetermined marginal area in a pixel active area of the reflective light modulation device and limits light with which the reflective light modulation device is irradiated, and
   the aperture portion has a smaller marginal area than the second light blocking member and limits light with which the reflective light modulation device is irradiated.

4. The optical device according to claim 1, in which the light modulation unit further includes a second light blocking member that limits light with which the reflective light modulation device is irradiated to light passing a second aperture portion, said second light blocking member being arranged between the optical compensation element and the reflective light modulation device.

5. An optical device comprising:
   a light synthesis prism that synthesizes incident light beams which are incident to a plurality of incidence surfaces and outputs the synthesized light beams;
   a light modulation unit that includes an optical compensation element and a reflective light modulation device; and
   a fixing member that fixes a reflective polarization element and the light modulation unit to the light synthesis prism so as to correspond to one of the incidence surfaces,
   wherein the light modulation unit includes
   a light blocking member that blocks light from reaching the light modulation unit and limits light with which the optical compensation element and the reflective light modulation device are irradiated, to light passing an aperture portion; and
   a heat insulating member that comes into contact with the light blocking member and the fixing member,
   wherein the light blocking member can change between a first state and a second state which are different from each other in an amount of limiting light which passes the aperture portion.

6. The optical device according to claim 5, wherein the light blocking member changes between the first state and the second state based on the number of pixels used in a display.

7. The optical device according to claim 5, wherein either of the first state and the second state limits passing light to 0.

8. A projection device comprising:
   a light source;
   an optical device that separates light beams emitted from the light source according to wavelength bands for modulation and synthesizes and emits the modulated light beams; and
   a projection means for projecting and outputs the light beams emitted from the optical device,
   wherein the optical device includes
   a light synthesis prism that synthesizes incident light beams which are incident to a plurality of incidence surfaces and outputs the synthesized light beams;
   a light modulation unit that has an optical compensation element and a reflective light modulation device; and
   a fixing member that fixes a reflective polarization element and the light modulation unit to the light synthesis prism so as to correspond to one of the incidence surfaces, and
   the light modulation unit includes
   a light blocking member that blocks light from reaching the light modulation unit and limits light with which the optical compensation element and the reflective light modulation device are irradiated, to light passing an aperture portion; and
   a heat insulating member that comes into contact with the light blocking member and the fixing member, and
   the light blocking member includes
   a heat insulating member contact portion that comes into contact with the heat insulating member; and
   a light blocking portion that has the aperture,
   in which the light blocking portion and the heat insulating member contact portion have a step difference of a predetermined height.

9. The projection device according to claim 8, in which the light modulation unit further includes a second light blocking member that limits light with which the reflective light modulation device is irradiated to light passing a second aperture portion, said second light blocking member being arranged between the optical compensation element and the reflective light modulation device.

* * * * *